(12) United States Patent
Kawata et al.

(10) Patent No.: US 8,240,772 B2
(45) Date of Patent: Aug. 14, 2012

(54) SEATBELT HOLDING STRUCTURE

(75) Inventors: Takahiro Kawata, Saitama (JP); Shushi Hosoya, Saitama (JP)

(73) Assignee: COMBI Corporation, Tokyo (JP)

( * ) Notice: Subject to any disclaimer, the term of this patent is extended or adjusted under 35 U.S.C. 154(b) by 116 days.

(21) Appl. No.: 12/601,451

(22) PCT Filed: May 22, 2008

(86) PCT No.: PCT/JP2008/059421
§ 371 (c)(1),
(2), (4) Date: May 10, 2010

(87) PCT Pub. No.: WO2008/146695
PCT Pub. Date: Dec. 4, 2008

(65) Prior Publication Data
US 2010/0213696 A1 Aug. 26, 2010

(30) Foreign Application Priority Data

May 25, 2007 (JP) ................. 2007-138573

(51) Int. Cl.
*A47D 15/00* (2006.01)
*A62B 35/00* (2006.01)
*B60N 2/26* (2006.01)
(52) U.S. Cl. .................. 297/482; 297/219.12
(58) Field of Classification Search ............ 297/219.12, 297/481, 482
See application file for complete search history.

(56) References Cited

U.S. PATENT DOCUMENTS

| 5,108,152 A * | 4/1992 | Reilly et al. .................. 297/482 |
| 6,688,701 B1* | 2/2004 | Weaver ..................... 297/482 X |
| 6,955,403 B1* | 10/2005 | Weaver ..................... 297/482 X |
| 2006/0001299 A1* | 1/2006 | Sallus ...................... 297/219.12 |
| 2006/0097563 A1 | 5/2006 | Kassai et al. |
| 2011/0227392 A1* | 9/2011 | Morrissey .................. 297/482 |

FOREIGN PATENT DOCUMENTS

| EP | 1616509 A1 | 1/2006 |
| EP | 1623891 A2 | 2/2006 |
| EP | 1707453 A1 | 10/2006 |
| JP | 09-188221 A | 7/1997 |
| JP | 2001-158263 A | 6/2001 |
| JP | 2001158263 A | 6/2001 |
| JP | 2001-301501 A | 10/2001 |
| JP | 2001-328471 A | 11/2001 |

OTHER PUBLICATIONS

Extended European Search Report corresponding to European Patent Application No. 08764494.4, dated Dec. 20, 2010.

* cited by examiner

*Primary Examiner* — Rodney B White
(74) *Attorney, Agent, or Firm* — Sughrue Mion, PLLC

(57) ABSTRACT

A seatbelt holding structure that comprises a seat body 10 on which a seater is seated, a seatbelt 20 that restrains the seater seated on the seat body 10, and a belt cover 40 as a belt holding unit that holds the seatbelt 20 in a direction in which a seating space of the seat body 10 is open.

7 Claims, 9 Drawing Sheets

(a)

(b)

SEATBELT HOLDING STRUCTURE

CROSS REFERENCE TO RELATED APPLICATION

This application is a National Stage of International Application No. PCT/JP2008/059421 filed May 22, 2008, claiming priority based on Japanese Patent Application No. 2007-138573, filed May 25, 2007, the contents of all of which are incorporated herein by reference in their entirety.

TECHNICAL FIELD

The present invention relates to a seat of various kinds such as a child car seat, and relates to a seatbelt holding structure to hold a seatbelt in a non-fastened state at such a position and an angle that a seating space is not obstructed thereby.

BACKGROUND ART

A child car seat that is detachably mounted to a vehicle seat is roughly constituted by a seat body and seatbelts. The seatbelts are provided in a right-and-left pair on the front surface of the seat body, and are formed to come down from positions above shoulders of an infant seated on the seat body to positions below sides of the body of the infant. A tongue (fastening plate) is attached to each seatbelt, and by detachably engaging this tongue with a buckle (locking part) that is provided at a lower position on the front surface of the seat body, it is possible to securely restrain the infant at five points, that is, upper two points and lower three points.

The respective seatbelts are generally formed by weaving polyester fibers into a shape of a belt, and therefore have high flexibility. Accordingly, if the buckle is removed from the fastening plate to bring the seatbelts into a non-fastened state and the infant is removed from the child car seat, the respective seatbelts hang over the front surface of the seat body. When the infant is to be seated on the child car seat again in this state, conventionally, it is necessary to seat the infant once on the hanging seatbelts, and then pull the seatbelts caught under the infant outward, to fasten the seatbelts.

However, such an operation is inconvenient for a parent, and because the body of the infant is shaken, it gives an uncomfortable feeling to the infant. To solve such problems, a holding structure to hold seatbelts in a non-fastened state so as not to obstruct the seating space has conventionally been proposed (for example, see Patent Document 1). In this structure, appliques in which magnets are embedded are fixed to the seat body, and by holding the buckles at the ends of the seatbelts by the magnets, the seating space is kept open.

Patent Document 1: Japanese Patent Application Laid-open No. 2001-158263

DISCLOSURE OF INVENTION

Problem to be Solved by the Invention

However, in the above conventional holding structure, only the ends of seatbelts are held, and other parts, for example, upper end portions of the seatbelts are still hanging. Therefore, it is still not adequate to make the seating space open. In addition, as for the ends of the seatbelts, there are problems such that, when appliques are fixed to the seat body, the appliques can accidentally attract the attention of the infant and to be tampered, or the appliques can be lost and to be unable to hold the seatbelts.

The present invention has been achieved in view of the above problems, and an object of the present invention is to provide a seatbelt holding structure that can increase the openness of a seating space by holding the entire seatbelt, and that can prevent tampering of an attachment by an infant or loss of the attachment.

Means for Solving Problems

To solve the above problems and achieve the object, the invention comprises a seat body on which a seater is seated, a seatbelt that restrains a seater seated on the seat body, and a belt holding unit that holds the seatbelt in a direction in which a seating space of the seat body is open.

The invention further comprises a belt cover that covers at least a part of the seatbelt, wherein the belt holding unit is provided at an end portion of the belt cover adjacent to the seat body, and includes a pressing unit that holds the seatbelt by pressing the seat body.

The invention further provides wherein the seatbelt is provided at positions that correspond to both sides on right and left of a seater seated on the seat body, the belt cover includes a right-and-left pair of cover bodies arranged to correspond to seatbelts on the both sides on right and left, respectively, and a connecting unit that connects the right-and-left pair of cover bodies to each other, and the pressing unit is held in close contact with the seat body by drawing the right-and-left pair of cover bodies to each other by the connecting unit.

The invention further provides wherein at least portions of the right-and-left pair of cover bodies are arranged on a front side of the seat body, and at least portions of the connecting unit are arranged on a rear side of the seat body.

The invention further provides wherein the belt holding unit includes a first magnet that is arranged at either one of the seat body and the seatbelt, and any one of a second magnet and a magnetic substance that is arranged in another one of the seat body and the seatbelt at a position corresponding to the first magnet.

The invention further provides a belt cover that covers a portion of the seatbelt at an approximately upper position relative to a seat of the seat body, wherein any one of the first magnet and the second magnet or the magnetic substance is arranged inside the belt cover.

The invention further provides wherein the seat body includes a shell and a seat cover that covers at least a part of an outer surface of the shell, and any one of the first magnet and the second magnet or the magnetic substance is arranged on the outer surface of the shell that is covered by the seat cover.

The invention further provides wherein a fastening plate is provided in the seatbelt, a fixing part to releasably fix the fastening plate is provided in the seat body, and the fastening plate is arranged as the first magnet.

Effect of the Invention

According to the invention, the seatbelts can be held in an open direction using the belt holding unit. Therefore, even in a state before a seater is seated, it is possible to prevent the seatbelts from hanging inward on the front of the seat body, and the seating space can be maintained open without interposition of the seatbelts. As a result, even when a seater is seated in the seating space, the seatbelts are not caught under the seater, and the process of pulling the seatbelts out from the underneath of the seater is not required. Also, the seater such as an infant is not carelessly shaken, and thus any uncomfortable feeling is not given. Moreover, by holding the seatbelts in a certain direction, twists of the seatbelts can be avoided, and improper use in which the seatbelts are fastened in a twisted state can be prevented.

According to the invention, the upper portions of the seatbelts can be held only by attaching the belt cover. Particularly, because the belt cover itself is the one conventionally used, new parts or operations are not required. Therefore, as well as it is possible to maintain simplicity in manufacturing and use of the seat, the manufacturing cost is not increased.

According to the invention, by holding the pressing units closely to the seat body by the connecting unit, the pressing force of the pressing units to the seat body is increased to improve a seatbelt holding force. Therefore, the seating space on the front of the seat body can be made further open.

According to the invention, by arranging at least a part of the connecting unit on the rear side of the seat body, the connecting unit does not damage the design of the seat, and it is possible to prevent giving an uncomfortable feeling to a seater by the connecting unit.

According to the invention, the seatbelts can be held using the first magnet and the second magnet or a magnetic substance. Therefore, even in a state before a seater is seated, it is possible to prevent the lower portions of the seatbelts from hanging inward on the front of the seat body, and to maintain the seating space open without interposition of the seatbelts.

According to the invention, the first magnet and the second magnet or a magnetic substance are covered by the belt cover, and not exposed to the outside. Therefore, it is possible to prevent tampering of the first magnet and the second magnet or the magnetic substance, by a seater such as an infant, and to prevent these components from accidentally contacting the seater to give an uncomfortable feeling. Furthermore, when a seater such as an infant is picked up from the seat, usually, hands are inserted to positions above and near the seat of the seat body, and this action results in naturally pressing the lower portions of the seatbelts outward to the right and left. Therefore, the lower portions of the seatbelts pressed outward to the right and left are held, as pressed by the first magnet and the second magnet or the magnetic substance. Therefore, the lower portions of the seatbelts can be held by bringing the first magnet and the second magnet, or the magnetic substance close to each other without performing any particular operation.

According to the invention, the first magnet and the second magnet or the magnetic substance are covered by the seat cover, and are not exposed to the outside. Therefore, it is possible to prevent tampering of the first magnet and the second magnet or the magnetic substance, by a seater such as an infant, and to prevent these components from accidentally contacting the seater to give an uncomfortable feeling.

According to the invention, the fastening plate of the seatbelts is arranged as the first magnet. Therefore, only by changing the material of the fastening plate conventionally used, a part of the belt holding unit can be formed. Because the first magnet is not required to be fixed separately or the like, the seatbelt holding structure can be formed further simply.

EXPLANATIONS OF REFERENCE NUMERALS

Figure 1:
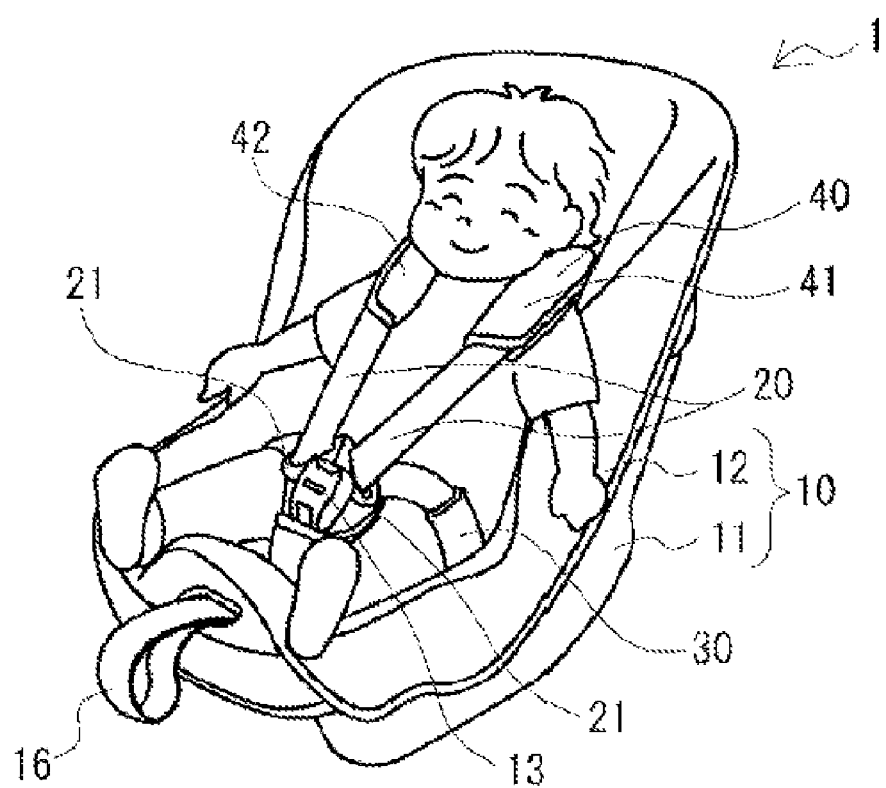
FIG. 1 A perspective view of a child car seat when an infant is seated thereon.

1 child car seat
10 seat body
11 shell
12 seat cover
13 buckle
14, 31, 43, 44 insertion hole
15 fixing bracket
16 adjustment belt
17 second magnet
18 concave portion
20 seatbelt
21, 70 tongue
30, 40, 60 belt cover
41, 42 cover body
45 connecting belt
46 pressing unit
47, 48 side
50 first magnet
51 attachment cloth
61 second connecting belt

BEST MODE(S) FOR CARRYING OUT THE INVENTION

Embodiments of a seatbelt holding structure according to the present invention will be explained below in detail with reference to the accompanying drawings. First, [I] the basic concept common to respective embodiments is explained, [II] specific contents of the embodiments are then explained, and finally [III] modifications of the respective embodiments are explained. The present invention is not limited to the embodiments.

[I] Basic Concept Common to Respective Embodiments

The basic concept common to respective embodiments are explained first. A seatbelt holding structure according to the respective embodiments is a structure to hold a seatbelt in a direction in which the seating space is open. The seatbelt is, for example, to hold a seater (including an infant, a youth, an adult, and an elderly person) on a seat (including a seat of means of transport such as a vehicle and an airplane, and chairs of various kinds, such as a wheel chair) in a seated state. A case where an infant is the seater is explained using a seatbelt of a child car seat that is mounted on a seat of a vehicle as an example below.

The direction in which the seating space is open (hereinafter, "open direction") means a direction in which a seatbelt is held so as to create the open space without the seatbelt on the front surface of a seat, as a state of the seat at least before a seater is seated on the seat. For example, an upper portion of a seatbelt is held in a direction perpendicular to the surface of a backrest of a seat body, or is held at an angle directing outward along the surface of the backrest (if the seatbelt is provided in a right-and-left pair on the front surface of the seat body, a right seatbelt is held rightward, and a left seatbelt is held leftward). By adopting such an opening structure, it is possible to prevent a seatbelt from hanging inward on the front of the seat body, and to keep the seating space open without the seatbelt interposed therein even before an infant is seated.

The opening space is not necessarily limited to a space from which a seatbelt is completely removed, and includes all kinds of spaces in which interposition of a seatbelt is reduced even slightly as compared with a conventional state. Moreover, holding a seatbelt at a predetermined angle or position to maintain or to improve wearing comfort of a seatbelt for a seater and security after a seater is seated can also be included, not only before the seater is seated on a seat.

[II] Specific Contents of Respective Embodiments

Specific contents of the respective embodiments according to the present invention are explained next.

First Embodiment

A first embodiment is explained first. In this embodiment, an upper portion of a seatbelt is held by a belt cover that covers the seatbelt, and a lower portion of the seatbelt is held by a magnetic force.

(Entire Structure of Child Car Seat)

Figure 2:
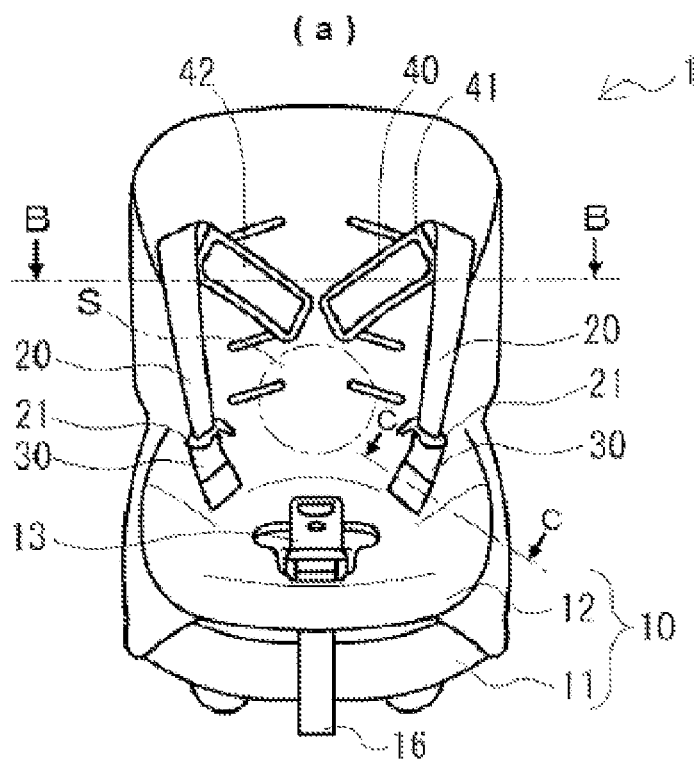
FIG. 2 Front views of a child car seat, where (a) is a state before an infant is seated, and (b) is a state immediately after an infant is seated.
Figure 2:
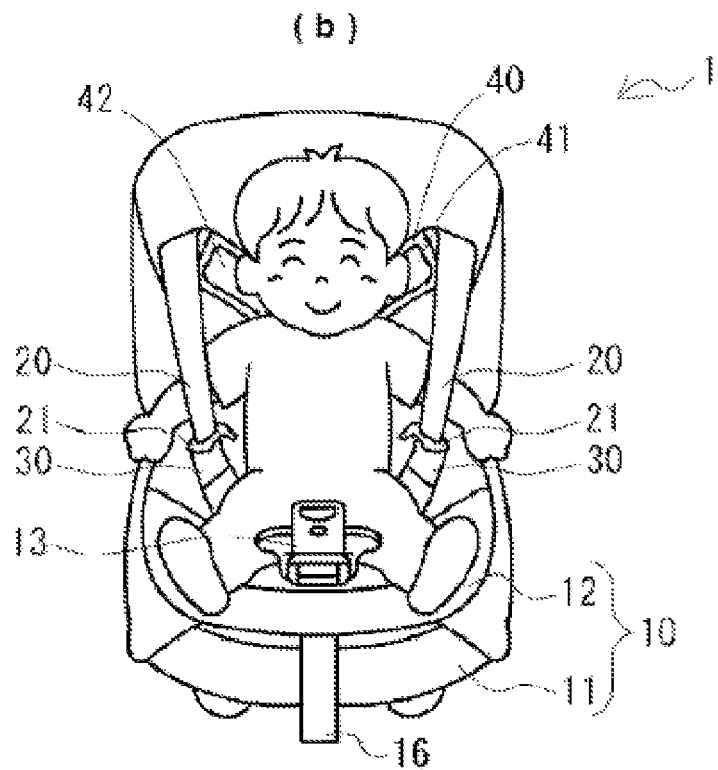
Figure 3:
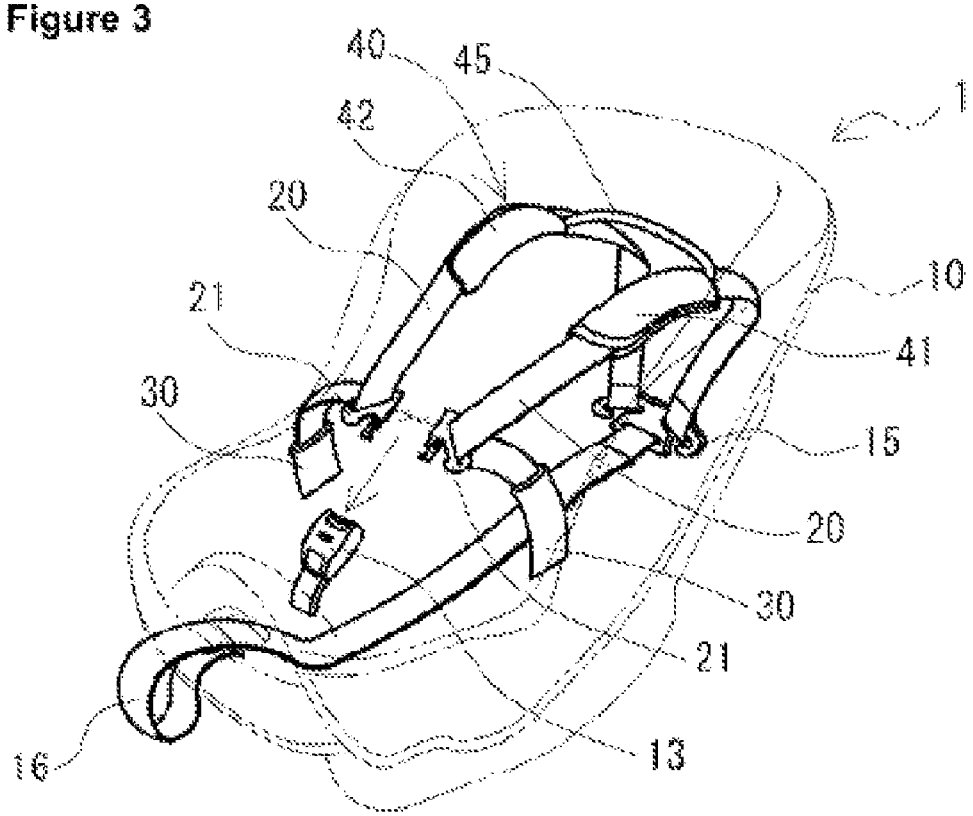
FIG. 3 A perspective view showing a correlation among respective belts.
Figure 4:
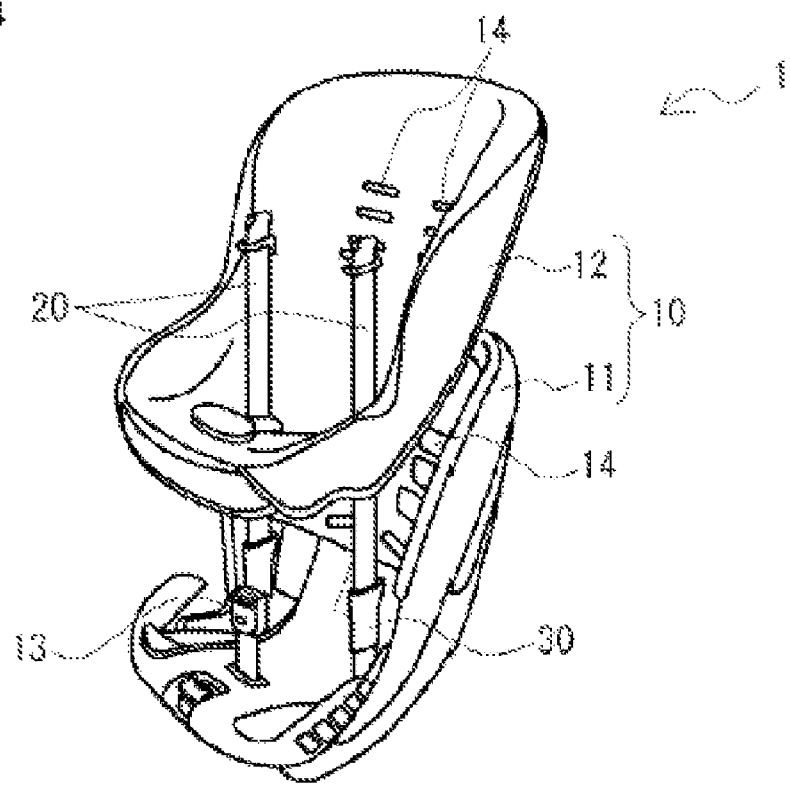
FIG. 4 An exploded perspective view of a seat body.
Figure 5:
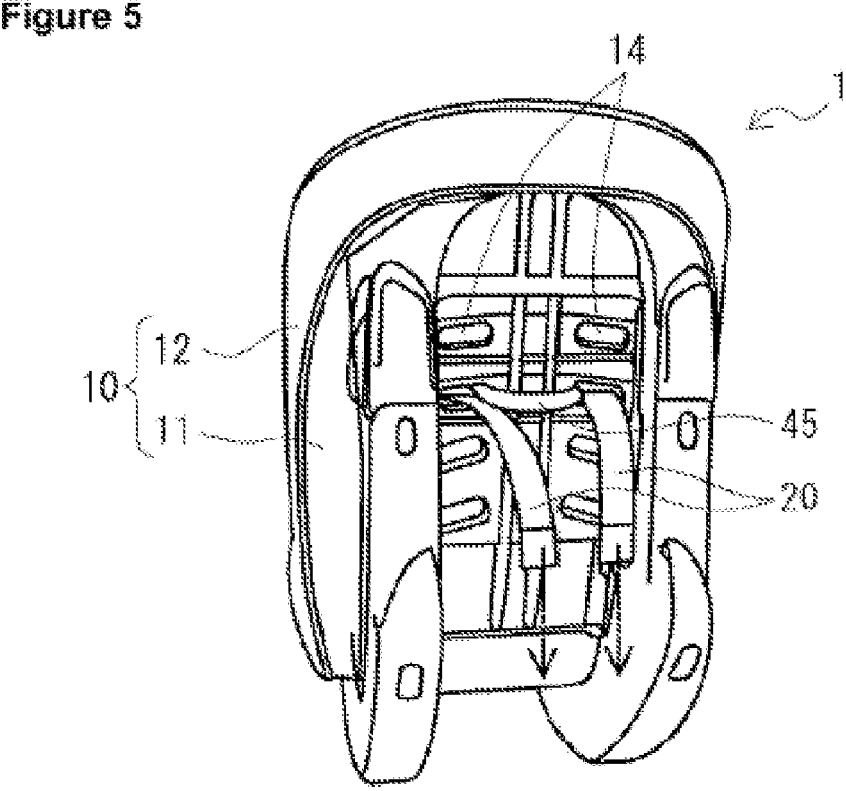
FIG. 5 A perspective view of the seat body viewed from a rear surface side.

An entire structure of a child car seat according to the present embodiment is explained first. FIG. 1 is a perspective view of the child car seat when an infant is seated thereon, FIG. 2 are front views of the child car seat, where (a) is a state before an infant is seated, and (b) is a state immediately after an infant is seated, FIG. 3 is a perspective view showing a correlation among respective belts (a seat body is shown by a phantom line), FIG. 4 is an exploded perspective view of the seat body, and FIG. 5 is a perspective view of the seat body viewed from a rear surface side. A child car seat 1 is roughly constituted by a seat body 10 and seatbelts 20.

The seat body 10 is constituted by a shell 11 and a seat cover 12. The shell 11 is a fundamental structure of the child car seat 1, and is formed into a shape in which an infant can be held in a seated state using a material such as hard resin having a required hardness. On a bottom surface and a rear surface of the shell 11, a conventional fixing structure (not shown) to fix the child car seat 1 to a seat (not shown) of a vehicle is provided, and the child car seat 1 can be detachably attached to a seat of a vehicle with the fixing structure. The seat cover 12 covers the shell 11 from a front side thereof, and is formed into a shape that substantially coincides with a front surface of the shell 11 using a soft material such as urethane. By detachably attaching the seat cover 12 to the shell 11, the comfort when an infant is seated can be improved.

The seatbelts 20 are provided at positions corresponding to a right side and a left side of an infant seated on the seat body 10. The respective seatbelts 20 are formed, for example, by weaving polyester fibers into a shape of a belt similarly to conventional ones, and therefore, have high flexibility. The respective seatbelts 20 can be hanged from positions above shoulders of an infant to positions below sides of the buttocks of the infant as shown in FIG. 2(b), and tongues (fastening plates) 21 are attached at positions slightly lower than the center in the longitudinal direction thereof. After seating an infant on the seat body 10 as shown in FIG. 2(b), the respective tongues 21 of the seatbelts 20 on both sides are brought next to each other to be coupled into one piece, and the coupled tongues 21 are inserted into a buckle (locking part) 13 arranged at a lower position on the front surface of the seat body 10 to be disengageably engaged therewith. Thus, the seatbelts 20 are temporarily fastened.

As shown in FIG. 4, lower end portions of the respective seatbelts 20 are drawn out to the bottom surface side of the seat body 10 sequentially through insertion holes (not shown) formed in the seat cover 12 and the shell 11 of the seat body 10, and are fixed to the seat body 10 at the bottom surface by a conventional fixing structure (not shown). In the lower portions of the seatbelts 20, belt covers 30 are arranged at positions near the upper portion relative to the seat of the seat body 10. The belt covers 30 are mainly to ease an uncomfortable feeling when the seatbelts 20 contact the legs of an infant, and are formed by sewing a cloth member made from a soft material such as urethane into a tubular shape. The seatbelts 20 can be removably inserted into insertion holes 31 (shown in FIG. 10 described later) therein.

Moreover, as shown in FIG. 5, the upper portions of the respective seatbelts 20 are drawn out to the rear side of the seat body 10 through the insertion holes 14 respectively formed in the seat cover 12 and the shell 11. The insertion holes 14 are provided in lines at multiple positions in the direction of height in a backrest portion of the seat body 10. By putting the seatbelts 20 through the insertion holes 14 that match the height according to the growth of an infant, the positions of the seatbelts 20 can be adjusted. The upper portions of the seatbelts 20 thus inserted through are releasably latched with a substantially T-shaped fixing bracket 15 that is arranged on the rear side as shown in FIG. 3. The fixing bracket 15 is fixed to an adjustment belt 16. The adjustment belt 16 is drawn out to the front side of the seat body 10 through an internal lower portion of the seat body 10. Therefore, if a front end portion of the adjustment belt 16 is pulled frontward after an infant is seated and the seatbelts 20 are temporary fastened as shown in FIG. 1, the fixing bracket 15 shown in FIG. 3 fixed to the adjustment belt 16 is pulled downward. As the fixing bracket 15 is pulled, the upper portions of the seatbelts 20 are pulled, and as a result, looseness of the seatbelts 20 is removed and the seatbelts 20 can be fastened closely to the infant.

Figure 6:
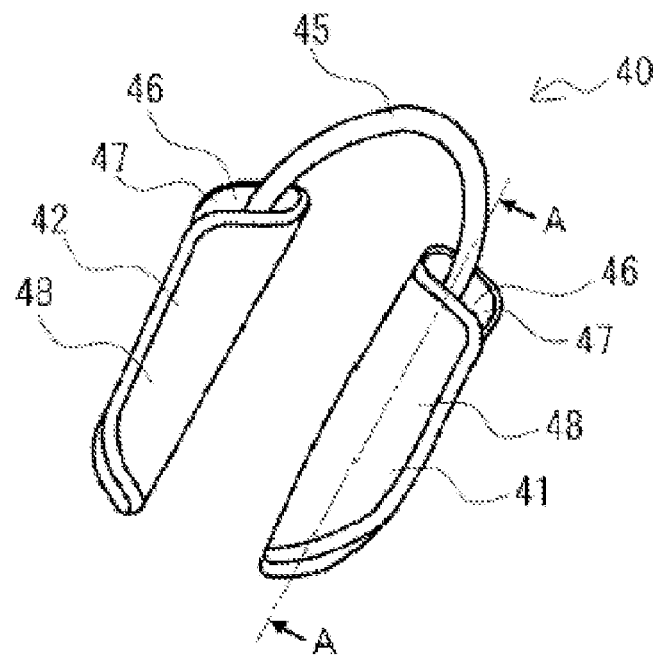
FIG. 6 A perspective view of a belt cover according to a first embodiment.
Figure 7:
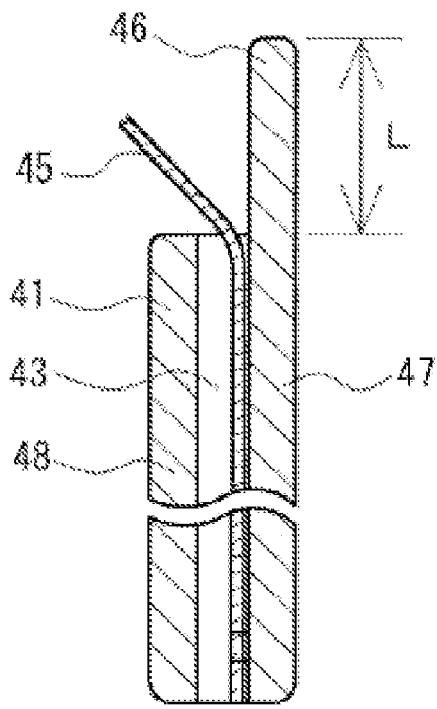
FIG. 7 An arrow sectional view taken along a line A-A in FIG. 6.
Figure 8:
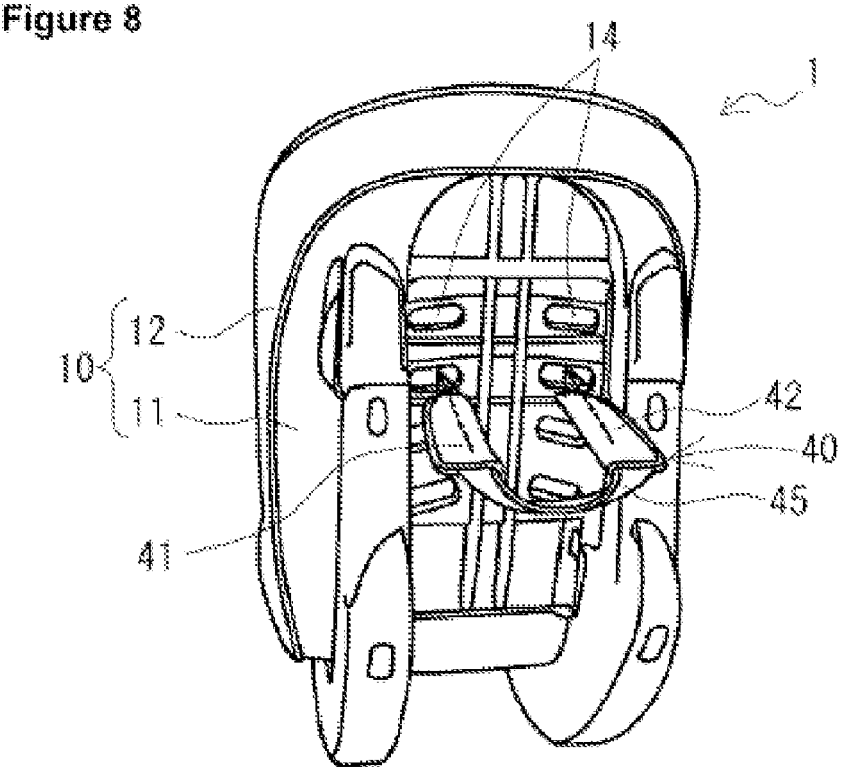
FIG. 8 An exploded perspective view showing how to attach the belt cover to a seat body.
Figure 9:
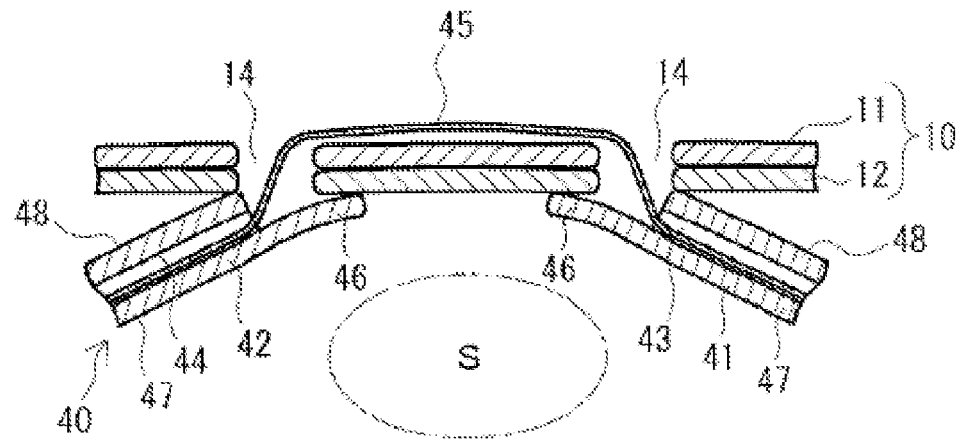
FIG. 9 An arrow sectional view taken along a line B-B in FIG. 2(*a*).

As shown in FIG. 1, a belt cover 40 is arranged at upper portions of the seatbelts 20. The belt cover 40 is mainly to improve security at an accident and to enhance comfort. FIG. 6 is a perspective view of the belt cover 40 according to the first embodiment, FIG. 7 is an arrow sectional view taken along a line A-A in FIG. 6, and FIG. 8 is an exploded perspective view showing how to attach the belt cover 40 to the seat body 10. The belt cover 40 includes a right-and-left pair of cover bodies 41 and 42, and a connecting belt 45 that connects the cover bodies 41 and 42 to each other. As shown in FIG. 7, the cover bodies 41 and 42 are formed by folding cloth members made from a soft material such as urethane double, and the seatbelts 20 can be removably inserted through insertion holes 43 and 44 (the insertion hole 44 is shown in FIG. 9 described later) therein. On the other hand, the connecting belt 45 is formed, for example, using the same material and method as the seatbelts 20, and is fixed to the cover bodies 41 and 42 by sewing together with the cover bodies 41 and 42 or the like in a state where both ends of the connecting belt 45 are inserted into the respective cover bodies 41 and 42 as shown in FIG. 7.

As for attachment procedure of the belt cover 40, for example, as shown in FIG. 8, before the upper end portions of the seatbelts 20 are put through the insertion holes 14 of the seat body 10, the cover bodies 41 and 42 of the belt cover 40 are put through the insertion holes 14 to which the upper end portions of the seatbelts 20 are to be inserted, from the rear side to the front side. In this state, only the connecting belt 45 remains on the rear side of the seat body 10. The upper end portions of the seatbelts 20 are then put through the insertion holes 43,44 of the cover bodies 41 and 42, and the upper end portions of the seatbelts 20 are drawn out to the rear side further through the insertion holes 14 of the seat body 10. Thus, the upper portions of the seatbelts 20 can be covered by the cover bodies 41 and 42.

(Holding Structure to Open Child Car Seat 1—Upper Portions)

The holding structure to open the child car seat 1 is explained next. In the present embodiment, two structures including a structure of the upper portion and a structure of the lower portion of the seatbelts 20 are mentioned, and the structure of upper portion is explained first. This structure roughly is to hold the upper portions of the seatbelts 20 in the open direction using the belt cover 40. Specifically, as shown in FIGS. 6 and 7, ends facing a seating space S out of one end portions (portions on the side adjacent to the seat body 10) of the cover bodies 41 and 42 of the belt cover 40 are made into pressing units 46 in which the ends are more extended as compared with the conventional ones. By pressing the seat body 10 by the pressing units 46, the seatbelts 20 are separated from the seating space S. The pressing units 46 correspond to the belt holding unit in the claims.

The pressing units 46 are formed, as shown in FIG. 7, by extending the ends of the cover bodies 41 and 42 (only the cover body 41 is shown in FIG. 7) by a length L from that of the conventional cover bodies 41 and 42, and are formed with the same material as the cover bodies 41 and 42. Therefore, the pressing units 46 have elasticity similar to that of the cover bodies 41 and 42. When the pressing units 46 abut on the seat body 10, the pressing units 46 press the seat body 10 by elastic repulsion, to separate the cover bodies 41 and 42 from the seat body 10. FIG. 9 is an arrow sectional view taken along a line B-B in FIG. 2. The pressing units 46 are provided only on a side 47 on the side facing the seating space S out of respective sides 47 and 48 of the cover bodies 41 and 42 folded double, and by pressing the side facing the seating space S away from the seat body 10 (bringing the side not facing the seating space S close to the seat body 10), the cover bodies 41 and 42 are separated from the seating space S.

Adjustment of the degree of the separation can be performed by adjusting the length and elasticity of the pressing units 46. For example, the cover bodies 41 and 42 can be raised substantially perpendicularly to the backrest of the seat body 10 (the cover bodies 41 and 42 on the right when viewed from the front are raised slightly upward to the right, and the cover bodies 41 and 42 on the left when viewed from the front are raised slightly upward to the left). Accordingly, as shown in FIG. 2(a), the upper portions of the seatbelts 20 can be held in the open direction even in the state before an infant is seated, and it is possible to prevent the upper portions of the seatbelts 20 from hanging inward on the front of the seat body 10. Thus, the seating space S can be kept open without (with less) interposition of the seatbelts 20. Therefore, even if an infant is seated in the seating space S, the seatbelts 20 are not caught under the infant, and the process of pulling the seatbelts 20 out from the underneath of the infant is not required, and further, because it is not necessary to shake the infant carelessly, the infant is not given any uncomfortable feeling. After the infant is seated in the seating space S as shown in FIG. 2(b), by pulling the adjustment belt 16 against the elastic repulsion of the pressing units 46, looseness in the seatbelts 20 can be removed. Therefore, there is no harm in fastening the seatbelts 20.

(Holding Structure to Open Child Car Seat 1—Lower Portions)

Figure 10:
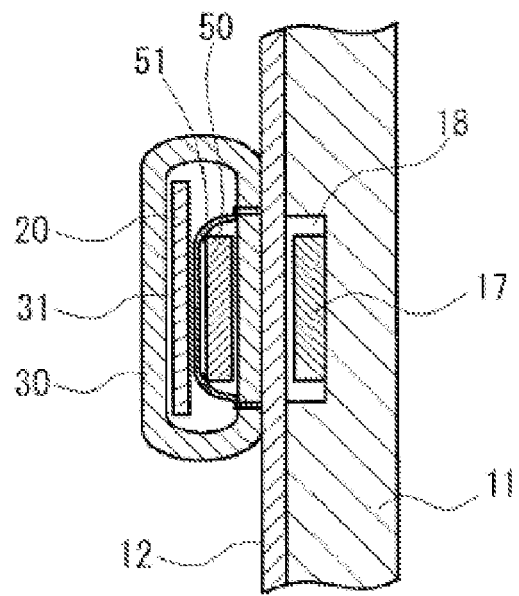
FIG. 10 An arrow sectional view taken along a line C-C in FIG. 2(*a*).
Figure 11:
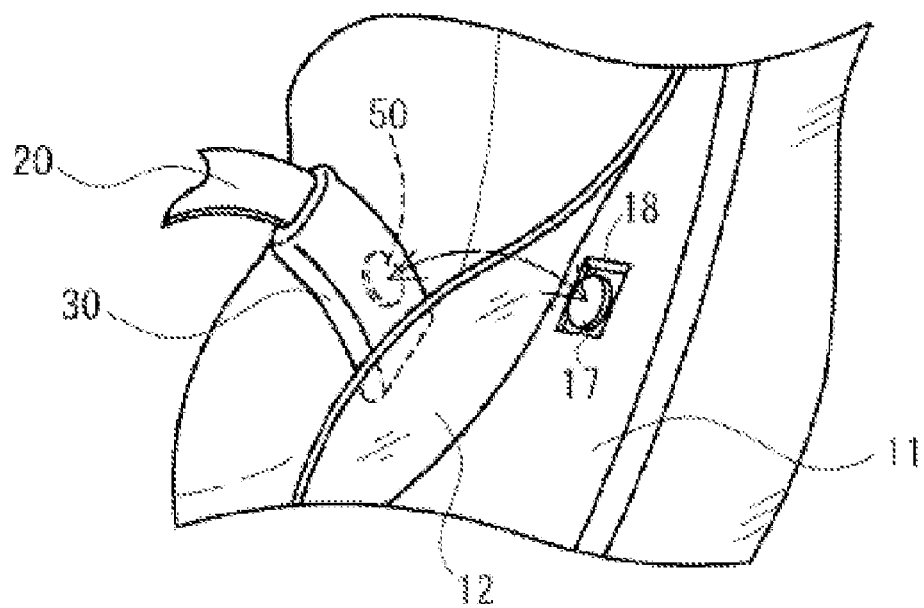
FIG. 11 A perspective view of a state where a portion of a belt cover is removed from a cover body.

Out of the holding structures to open the child car seat 1, the structure of the lower portion is explained next. This structure roughly is to hold the lower portions of the seatbelts 20 in the open direction by holding the lower portions of the seatbelts 20 close to the seat body 10 using a magnetic force. FIG. 10 is an arrow sectional view taken along a line C-C in FIG. 2(a), and FIG. 11 is a perspective view of a state where a portion of the belt covers 30 is removed from the cover bodies 41 and 42. As described above, in the lower portions of the seatbelts 20, the tubular belt covers 30 are provided at the upper positions relative to the seat of the seat body 10, and the seatbelts 20 are inserted through the insertion holes 31 of the belt covers 30.

Between the belt cover 30 and the seatbelt 20, a first magnet 50 that is a permanent magnet is arranged. Specifically, the first magnet 50 is fixed to the belt cover 30 by sewing or the like an attachment cloth 51 that covers the first magnet 50 to the belt cover 30. In this state, the first magnet 50 is covered by the belt cover 30 and is not exposed to the outside. Therefore, it is possible to prevent the tampering of the first magnet 50 by an infant, and to prevent the first magnet 50 from accidentally contacting the infant to give an uncomfortable feeling to the infant.

On the other hand, in the seat body 10, a second magnet 17 that is a permanent magnet is arranged. Specifically, the second magnet 17 is housed in a concave portion 18 that is formed in the seat body 10, and is fixed to the seat body 10 by joining with a bolt, by adhesive, or the like. In this state, the second magnet 17 is covered by the seat cover 12 and is not exposed to the outside. Therefore, it is possible to prevent the tampering of the second magnet 17 by an infant, and to prevent the second magnet 17 from accidentally contacting the infant to give an uncomfortable feeling to the infant.

A fixing position of the second magnet 17 is determined to such a position that the second magnet 17 is positioned close to the first magnet 50 of the seatbelt 20 when the seatbelt 20 is put along the seat body 10. Therefore, by thus putting the seatbelts 20 along the seat body 10, the first magnet 50 and the second magnet 17 are brought close to each other to be attracted to each other, thereby holding the seatbelt 20 in the state where the seatbelt 20 is put long the seat body 10. The first magnet 50 and the second magnet 17 correspond to the belt holding unit in the claims. Therefore, as shown in FIG. 2(a), the lower portions of the seatbelts 20 can be held in the open direction even in the state before an infant is seated, and it is possible to prevent the lower portions of the seatbelts 20 from hanging inward on the front of the seat body 10. Thus, the seating space S can be kept open without (with less) interposition of the seatbelts 20. Therefore, even if an infant is seated in the seating space S, the seatbelts 20 are not caught under the infant, and the process of pulling the seatbelts 20 out from the underneath of the infant is not required, and further, because it is not necessary to shake the infant carelessly, to give any uncomfortable feeling.

Effects of First Embodiment

According to the first embodiment, the seatbelts 20 can be maintained in the required state using the belt holding units. Therefore, even in a state before an infant is seated, it is possible to prevent the seatbelts 20 from hanging inward on the front of the seat body 10, and to maintain the seating space S open without interposition of the seatbelts 20.

Particularly, because the pressing units 46 of the belt covers 40 are used as the seat holding units, only by attaching the belt covers 40 to the child car seat 1 similarly to the conventional techniques, the upper portions of the seatbelts 20 can be held, and no particular part or operation is required. Therefore, as well as maintaining simplicity in manufacturing and use of the child car seat 1, the manufacturing cost is not increased.

Moreover, the lower portions of the seatbelts 20 can be maintained in the require state using the first magnet 50 and the second magnet 17. Therefore, even in a state before an infant is seated, it is possible to prevent the lower portions of the seatbelts 20 from hanging inward on the front of the seat body 10, and to maintain the seating space S open without interposition of the seatbelts 20.

Furthermore, the first magnet 50 is covered by the belt cover 30, and is not exposed to the outside. Therefore, it is possible to prevent tampering of the first magnet 50 by an infant, and to prevent the first magnet 50 from accidentally contacting the infant to give an uncomfortable feeling to the infant.

Moreover, the second magnet 17 is covered by the seat cover 12, and is not exposed to the outside. Therefore, it is possible to prevent tampering of the second magnet 17 by an infant, and to prevent the second magnet 17 from accidentally contacting the infant to give an uncomfortable feeling to the infant.

Particularly, when an infant is picked up from the child car seat 1, usually, hands are inserted to positions above and near the seat of the seat body 10, and by this action, the lower portions of the seatbelts 20 are naturally pressed outward to the right and left. As a result, the seatbelts 20 pressed outward to the right and left are held as pressed, by the first magnets 50 and the second magnets 17. Therefore, the lower portions of the seatbelts 20 can be brought into the required open state without performing any particular operation.

As described above, it is possible to prevent both the upper portions and the lower portions of the seatbelts 20 from hanging inward on the front of the seat body. Therefore, the seating space S can be maintained to an open space without (with less) interposition of the seatbelts 20, and even if an infant is seated in the seating space S, the seatbelts 20 are not caught under the infant. As a result, the process of pulling the seatbelts 20 out from the underneath the infant is not required, and because the infant is not carelessly shaken, any uncomfortable feeling is not given to the infant.

Furthermore, by thus holding the seatbelts 20 in a certain direction, twists of the seatbelts 20 can be avoided, and such improper use that the seatbelts 20 are fastened in the twisted state can be also avoided.

Moreover, because the seatbelts 20 can be held by such a permanent structure using the belt covers 30 and magnets, the concern that an applique or the like is lost, as the conventional technique using an applique, can be eliminated.

Second Embodiment

A second embodiment is explained next. In this embodiment, cover bodies of a belt cover are drawn toward each other through a connecting unit. The configurations of the second embodiment are substantially identical to those of the first embodiment unless otherwise specified, and like reference numerals and/or designations to ones used in the first embodiment are given to components substantially identical to those of the first embodiment as necessary, and explanations thereof will be omitted.

Figure 12:
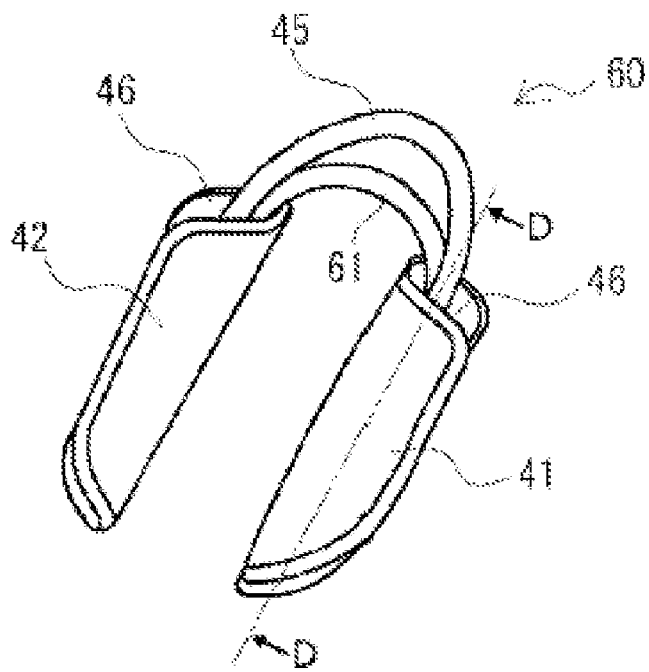
FIG. 12 A perspective view of a belt cover according to a second embodiment.
Figure 13:
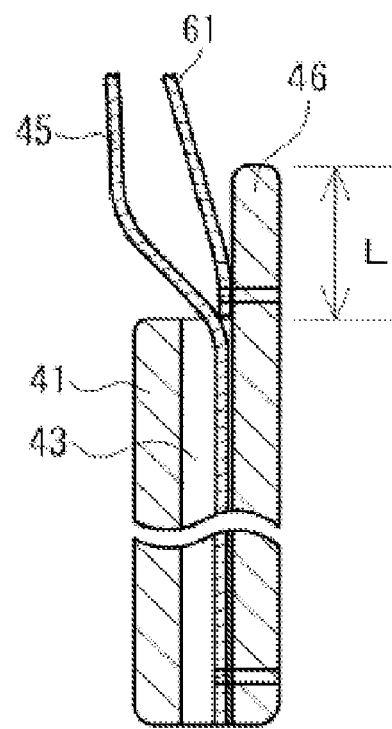
FIG. 13 An arrow sectional view taken along a line D-D in FIG. 12.
Figure 14:
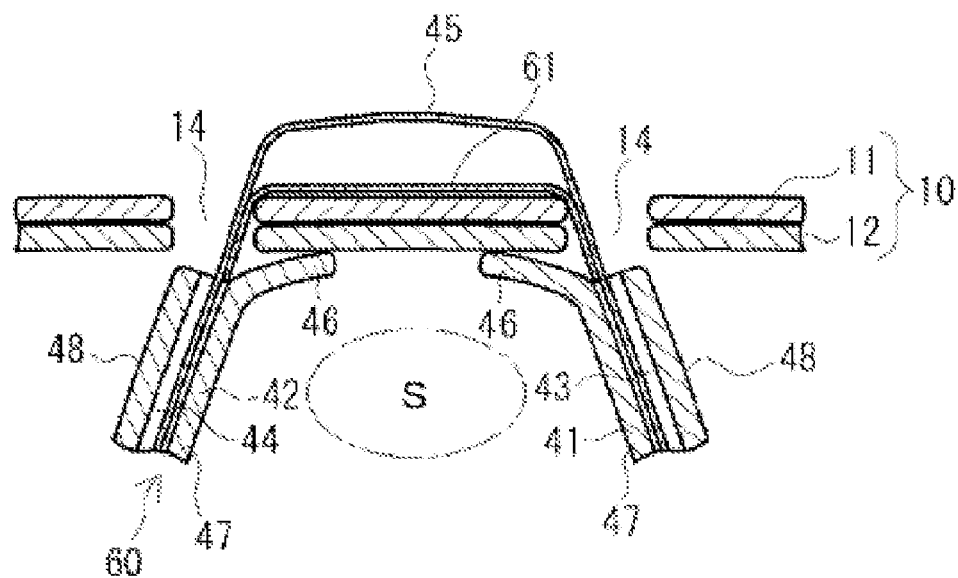
FIG. 14 A cross section of the belt cover according to the second embodiment at a section corresponding to a section shown in FIG. 9.

FIG. 12 is a perspective view of a belt cover according to the second embodiment, FIG. 13 is an arrow sectional view taken along a line D-D in FIG. 12, and FIG. 14 is a cross section of the belt cover according to the second embodiment at a section corresponding to a section shown in FIG. 9. A belt cover 60 further includes a second connecting belt 61, in addition to the right-and-left pair of cover bodies 41 and 42, and the connecting belt 45 that connects the cover bodies 41 and 42 to each other. The second connecting belt 61 corresponds to the connecting unit in the claims, and is formed in a belt shape using an elastic material such as synthetic rubber. The right-and-left pair of cover bodies 41 and 42 are drawn to each other by the elasticity. Because the second connecting belt 61 is arranged on the rear surface side of the seat body 10 similarly to the connecting belt 45, the second connecting belt 61 does not damage the design of the child car seat 1, and is not to be a target of tampering by an infant or is not to give any uncomfortable feeling to an infant.

In this case, as show in FIG. 14, the respective cover bodies 41 and 42 can be brought into further close contact to the seat body 10. Friction between the cover bodies 41 and 42 and the seat cover 12 is increased, and the elastic repulsion of the pressing units 46 is increased to increase the rise of the seatbelts 20. As a result, the seatbelts 20 can be raised at a larger angle relative to the backrest of the seat body 10 as compared to the case of the first embodiment shown in FIG. 9.

Effects of Second Embodiment

As described above, according to the second embodiment, by drawing the belt cover 60 arranged in a right-and-left pair to each other by the second connecting belt 61, the seatbelts 20 can be separated from the seat body 10 and the raised angle can be increased. Therefore, the seating space S on the front of the seat body 10 can be made further open.

Particularly, because the second connecting belt 61 is arranged on the rear side of the seat body 10, the second connecting belt 61 does not damage the design of the child car seat 1, and is not to be a target of tampering by an infant or is not to give any uncomfortable feeling to an infant.

Third Embodiment

A third embodiment is explained next. In this embodiment, the tongue is arranged as the first magnet. The configurations of the third embodiment are substantially identical to those of the first embodiment unless otherwise specified, and like reference numerals and/or designations to ones used in the first embodiment are given to components substantially identical to those of the first embodiment as necessary, and explanations thereof will be omitted.

Figure 15:
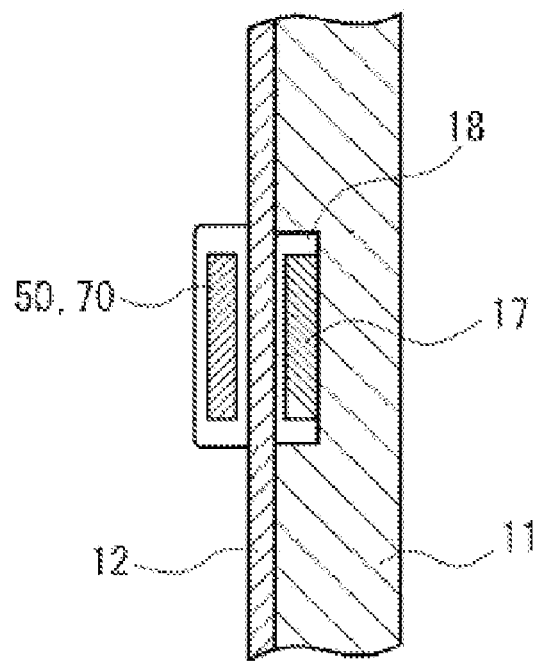
FIG. 15 A cross section of a tongue according to a third embodiment and the like on a section corresponding to a section shown in FIG. 10.
Figure 16:
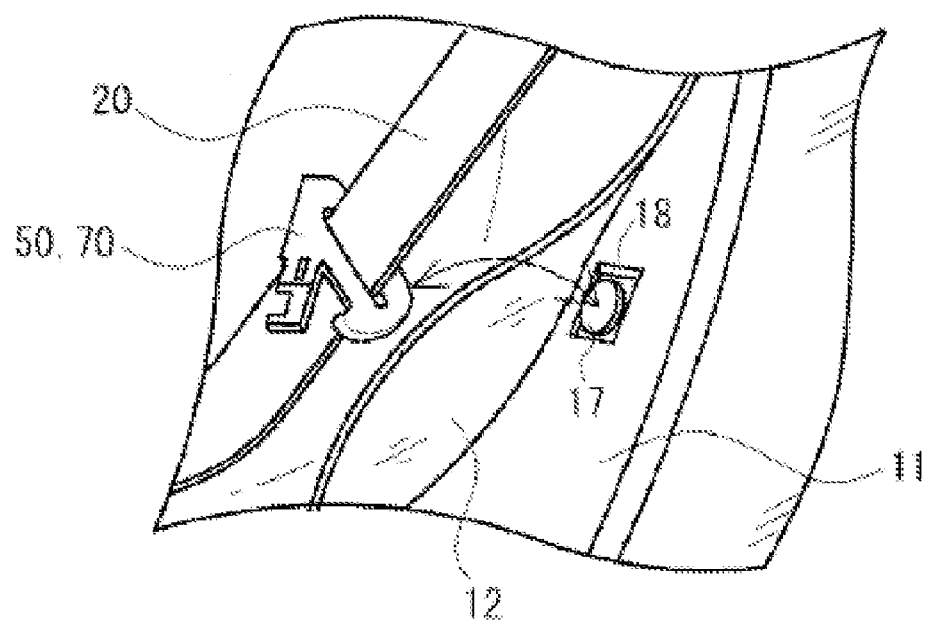
FIG. 16 A perspective view of a state in which a part of a belt cover is removed from a cover body.

FIG. 15 is a cross section of a tongue according to the third embodiment and the like on a section corresponding to that shown in FIG. 10, and FIG. 16 is a perspective view of a state in which a part of the belt cover 60 is removed from the cover bodies 41 and 42. Similarly to the first embodiment, tongues 70 are attached to each of the seatbelts 20 at positions slightly lower than the center in the longitudinal direction thereof, and are brought next to each other to be coupled into one piece, and the coupled tongues 70 are inserted into the buckle 13. Thus, the seatbelts 20 are fastened.

The entire or at least a part of the tongue 70 is formed as the first magnet. Therefore, by arranging the respective tongues 70 near the second magnet 17 in a not fixed state (lock released state) of the seatbelts 20, the seatbelts 20 can be held in a state where the seatbelts 20 are put along the seat body 10. In this arrangement also, the lower portions of the seatbelts 20 can be maintained in the required state similarly to FIG. 2(a). That is, in the third embodiment, the tongues 70 and the second magnets 17 function as the belt holding unit.

Effects of Third Embodiment

As described above, according to the third embodiment, the lower portions of the seatbelts 20 can be held in the open direction using the tongues 70 and the second magnets 17. Therefore, even in a state before an infant is seated, it is possible to prevent the lower portions of the seatbelts 20 from hanging inward on the front of the seat body 10, and to maintain the seating space S open without interposition of the seatbelts 20.

Particularly, because the tongues 70 are arranged to be the first magnets, only by changing the material of the tongues 70 conventionally been used, a part of the belt holding unit can be structured, and it is not necessary to fix the first magnet separately, or the like as in the first embodiment, the seatbelt holding structure can be formed further simply.

[III] Modifications of Respective Embodiments

While respective embodiments of the present invention have been explained above, specific configurations and means of the present invention can be arbitrarily modified or improved within the technical scope of the respective inventions described in the claims. Such modifications are explained below.

Problems to be Solved and Effects of the Invention

Problems to be solved by the invention and effects of the invention are not limited to the contents described above. Problems not mentioned above can be solved and effects not mentioned above can be achieved by the present invention, and there can be cases that only a part of the problems mentioned above is solved or only a part of the effects mentioned above is achieved by the invention.

Correlation Among the Respective Embodiments

The embodiments described above can be mutually combined by arbitrary combinations. For example, the first magnet of the first embodiment and the tongue of the third embodiment are provided at the same time, and either one of or both of the first magnet and the tongue can be arranged to be attracted to the seat body. In this case, for example, the second magnets 17 of the seat body can be provided in plural.

(About Belt Holding Unit)

The belt holding unit can be provided at arbitrary positions in plural, and for example, the belt cover 40 of the first embodiment can be provided at the lower portions of the seatbelts 20. Alternatively, the first magnet can be provided at the upper portions of the seatbelts 20. Moreover, one of the first magnet and the second magnet 17 can be changed to a magnetic substance such as a piece of iron, not using a permanent magnet. Moreover, the second connecting belt 61 can be arranged on the front side of the seat body 10. Alternatively, by forming the connecting belt 45 with an elastic material, it can be arranged to serve also as the second connecting belt 61.

INDUSTRIAL APPLICABILITY

The belt holding structure according to the present invention can be applied to a seat of various kinds such as a child car seat, and is useful to hold a seatbelt in a non-fastened state such that a seating space is not obstructed thereby.

The invention claimed is:

1. A seatbelt holding structure comprising:
    a seat body on which a seater is seated;
    a seatbelt that restrains a seater seated on the seat body; and
    a belt holding unit that holds the seatbelt in a direction in which a seating space of the seat body is open, wherein
    the belt holding unit is provided at an end portion of a belt cover adjacent to the seat body, and includes a pressing unit that holds the seatbelt by pressing the seat body.

2. The seatbelt holding structure according to claim 1, wherein
    the seatbelt is provided at positions that correspond to both sides on right and left of a seater seated on the seat body,
    the belt cover includes a right-and-left pair of cover bodies arranged to correspond to seatbelts on the both sides on right and left, respectively, and a connecting unit that connects the right-and-left pair of cover bodies to each other, and
    the pressing unit is held in close contact with the seat body by drawing the right-and-left pair of cover bodies to each other by the connecting unit.

3. The seatbelt holding structure according to claim 2, wherein
    at least portions of the right-and-left pair of cover bodies are arranged on a front side of the seat body, and at least a portion of the connecting unit is arranged on a rear side of the seat body.

4. A seatbelt holding structure comprising:
    a seat body on which a seater is seated;
    a seatbelt that restrains a seater seated on the seat body; and
    a belt holding unit that holds the seatbelt in a direction in which a seating space of the seat body is open, wherein
    the belt holding unit includes a first magnet that is arranged at either one of the seat body and the seatbelt, and any one of a second magnet and a magnetic substance that is arranged in another one of the seat body and the seatbelt at a position corresponding to the first magnet.

5. The seatbelt holding structure according to claim 4, comprising
    a belt cover that covers a portion of the seatbelt at an approximately upper position relative to a seat of the seat body, wherein
    any one of the first magnet and the second magnet or the magnetic substance is arranged inside the belt cover.

6. The seatbelt holding structure according to claim 4 or 5, wherein the seat body includes a shell and a seat cover that covers at least a part of an outer surface of the shell, and any one of the first magnet and the second magnet or the magnetic substance is arranged on the outer surface of the shell that is covered by the seat cover.

7. The seatbelt holding structure according to claim 4, wherein a fastening plate is provided in the seatbelt, a fixing part to releasably fix the fastening plate is provided in the seat body, and the fastening plate is arranged as the first magnet.

* * * * *